(12) United States Patent
Wallen et al.

(10) Patent No.: US 8,438,743 B2
(45) Date of Patent: May 14, 2013

(54) RESOLVER TYPE SKEW SENSOR WITH GIMBAL ATTACHMENT

(75) Inventors: Gregory T. Wallen, Roscoe, IL (US);
James M. Regan, Rockford, IL (US);
David J. Lang, Rockford, IL (US); Cory M. Crandall-Seibert, Roscoe, IL (US);
Mark D. Miller, Rockford, IL (US);
William E. Leden, Roscoe, IL (US);
Andrew N. Baines, Rockton, IL (US);
Jeffrey Paul Jacobs, Roscoe, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 13/150,502

(22) Filed: Jun. 1, 2011

(65) Prior Publication Data

US 2012/0304475 A1 Dec. 6, 2012

(51) Int. Cl.
*G01B 5/24* (2006.01)

(52) U.S. Cl.
USPC .............................. 33/1 PT; 33/645; 244/213

(58) Field of Classification Search .................. 33/1 PT, 33/613, 645, 783; 244/99.11, 213, 214, 215
See application file for complete search history.

(56) References Cited

U.S. PATENT DOCUMENTS

| | | | |
|---|---|---|---|
| 4,614,320 A | 9/1986 | Rutan | |
| 4,720,066 A | 1/1988 | Renken et al. | |
| 4,885,514 A | 12/1989 | Novis et al. | |
| 5,680,124 A * | 10/1997 | Bedell et al. | 244/215 |
| 5,686,907 A * | 11/1997 | Bedell et al. | 244/213 |
| 5,719,566 A | 2/1998 | Readman et al. | |
| 5,743,490 A | 4/1998 | Gillingham et al. | |
| 6,299,108 B1 * | 10/2001 | Lindstrom et al. | 244/213 |
| 6,483,436 B1 | 11/2002 | Emaci et al. | |
| 7,354,022 B2 * | 4/2008 | Richter et al. | 244/213 |
| 7,891,611 B2 * | 2/2011 | Huynh et al. | 244/215 |
| 8,226,048 B2 * | 7/2012 | Beyer et al. | 244/214 |
| 2006/0145028 A1 | 7/2006 | Richter et al. | |
| 2010/0059633 A1 | 3/2010 | Pohl | |
| 2010/0100355 A1 | 4/2010 | Marx et al. | |
| 2010/0140414 A1 * | 6/2010 | Beyer et al. | 244/214 |
| 2011/0024575 A1 * | 2/2011 | Wheaton et al. | 244/214 |

FOREIGN PATENT DOCUMENTS

EP 0922633 A2 6/1999

OTHER PUBLICATIONS

European Search Report mailed on Aug. 24, 2012 for EP Application No. 12169998.7.

* cited by examiner

*Primary Examiner* — G. Bradley Bennett
(74) *Attorney, Agent, or Firm* — Carlson, Gaskey & Olds, P.C.

(57) ABSTRACT

A disclosed sensor assembly for detecting movement and a position of a wing flap includes a sensing device that generates a signal corresponding to a position of the flap. The sensor assembly includes a linkage that is attached to the movable flap for mechanically communicating movement of the flap to the sensing device. The linkage includes a first pivot shaft mounted to the flap that is disposed about a first axis and a second pivot shaft attached to the first pivot shaft for movement about a second axis transverse to the first axis.

19 Claims, 5 Drawing Sheets

RESOLVER TYPE SKEW SENSOR WITH GIMBAL ATTACHMENT

BACKGROUND

This disclosure generally relates to a sensor arrangement for ascertaining a position of a movable wing flap. More particularly, this disclosure relates to a sensor arrangement that accommodates extended linear and rotational movement of a wing flap.

Aircraft include wings with movable flaps to tailor aerodynamic wing properties to desired flight operations. The flaps are moved utilizing an actuator that drives the flap to a desired position. As appreciated, control of the flap member requires knowledge of the current position of the flap. Information relating to the position of the flap is obtained through the use of a sensor. The sensor is mounted to measure movement of some portion of the flap actuation mechanism indicative of a position of the flap. Accordingly, a sensor mechanism is required to fit within the wing and also must accommodate full movement of the flap.

SUMMARY

A disclosed sensor assembly for detecting movement and a position of a wing flap includes a sensing device that generates a signal corresponding to a position of the flap. The sensor assembly includes a linkage that is attached to the movable flap for mechanically communicating movement of the flap to the sensing device. The example sensor assembly accommodates both linear and rotational components of movement of the flap from a retracted position to an extended position.

The linkage includes a first pivot shaft mounted to the flap that is disposed about a first axis and a second pivot shaft attached to the first pivot shaft for movement about a second axis transverse to the first axis. The linkage further includes at least one pivot arm that links the second shaft to the sensor. Movement of the first and second shaft about transverse axes accommodates both the linear and rotational movement of the flap and communicates that movement to the sensor.

These and other features disclosed herein can be best understood from the following specification and drawings, the following of which is a brief description.

DETAILED DESCRIPTION

Figure 1:
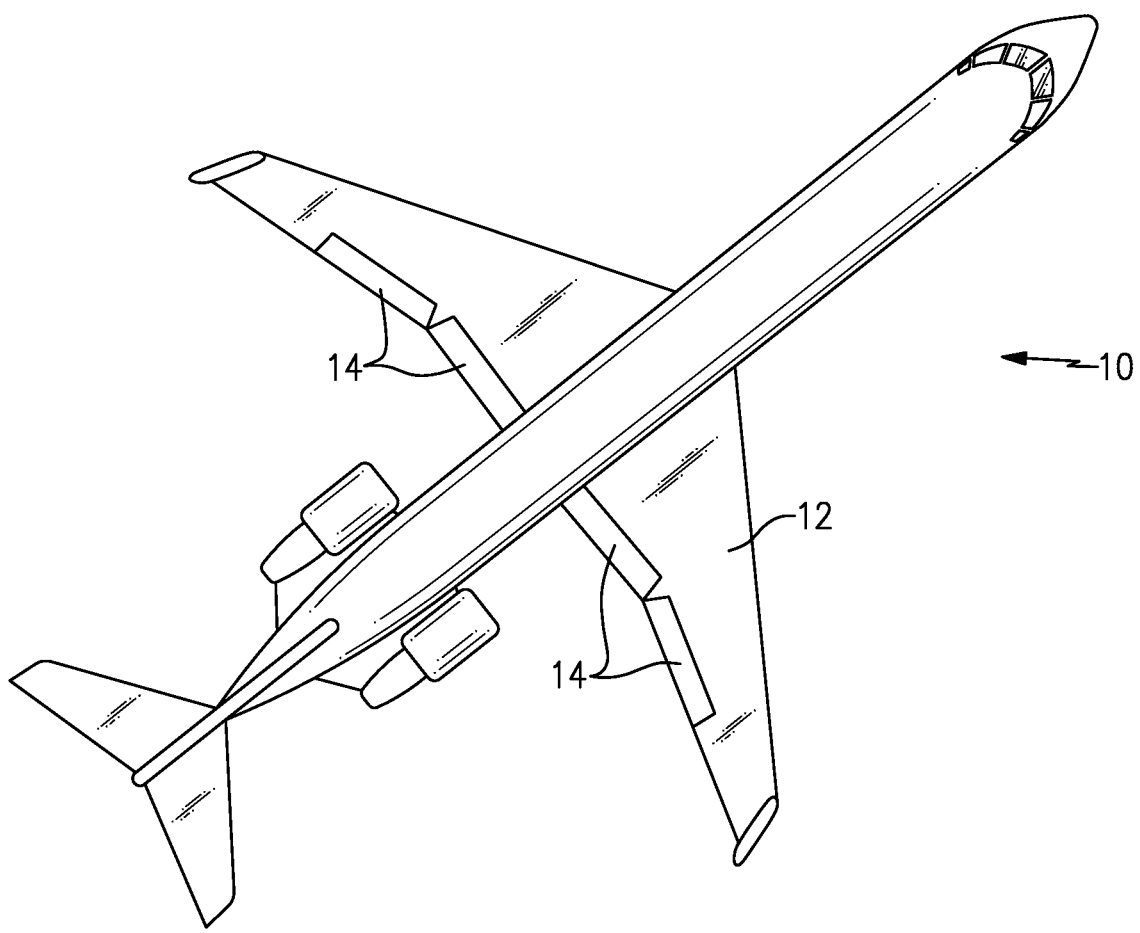
FIG. 1 is a schematic view of an example aircraft including movable flap elements.
Figure 2:
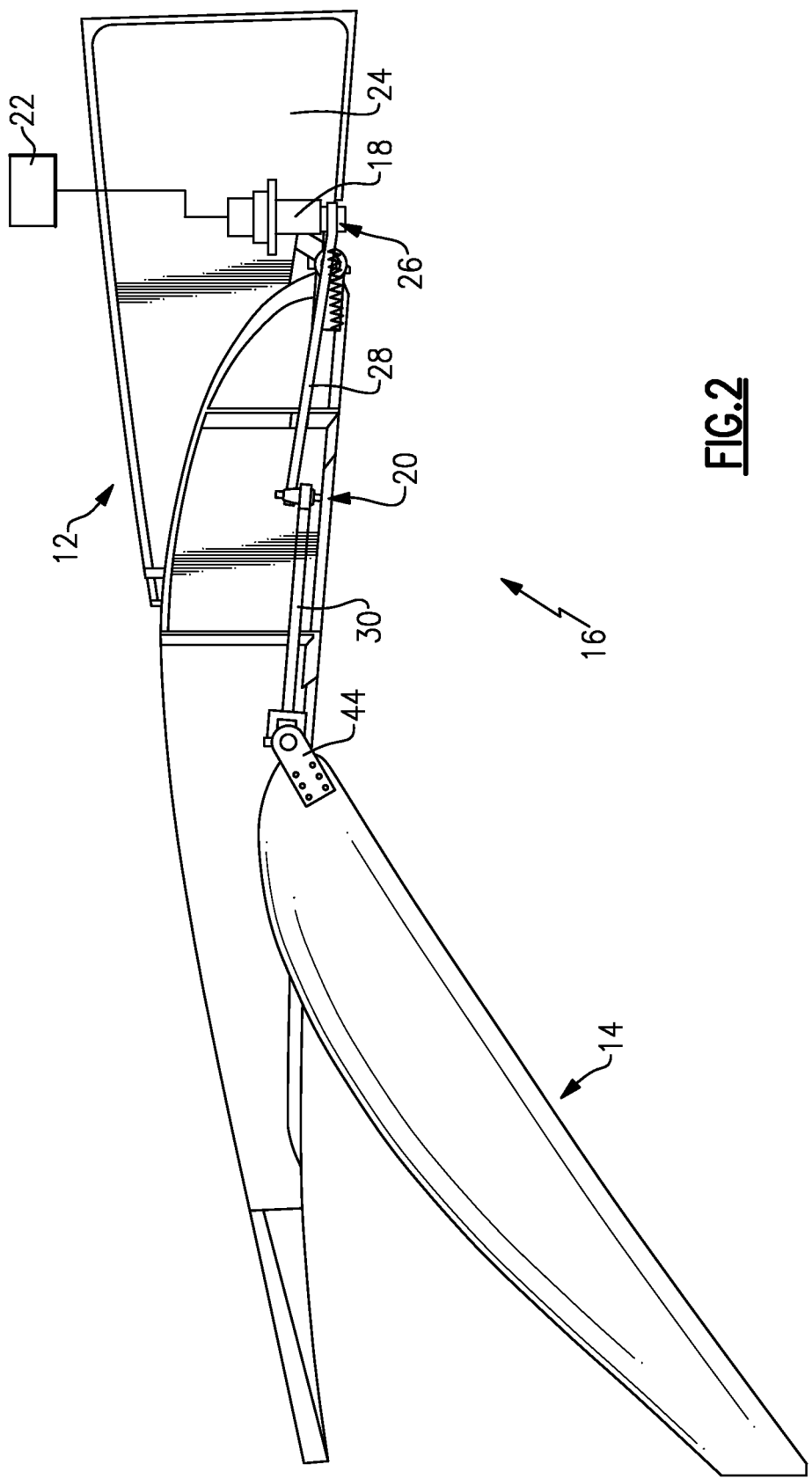
FIG. 2 is a partial sectional view of an example wing including a movable flap and sensor assembly.

Referring to FIGS. 1 and 2, an example aircraft 10 includes a fixed wing 12 having movable flap 14. The flaps 14 are examples of movable airfoil members, movable between a retracted position as is shown in FIG. 1 and an extended position as is shown in FIG. 2. Movement of the flaps 14 is detected and communicated to a controller 22 utilizing a sensor assembly 16. The sensor assembly 16 detects and communicates a position of the movable flap 14 to the controller 22. In this example the sensor assembly 16 includes a sensing device 18 that generates a signal indicative of the position of the flap 14 that is sent to the controller 22 to confirm that the flap 14 is in a desired position.

The example sensor assembly 16 includes a linkage 20 that is attached to the movable flap 14. The linkage 20 mechanically communicates movement of the flap 14 to the sensing device 18. Movement of the example flap 14 includes both linear and rotational components as it moves from the retracted position to the extended position. The sensor assembly 16 accommodates this movement through the linkage 20. The example linkage 20 accommodates full travel of the flap 14 between the extended and the retracted position. Moreover, the example sensor assembly 16 including the linkage 20 is also contained within the interior volume of the example wing 12. The example sensing device 18 is mounted to a fixed structure 24 within the wing 12 with the linkage being attached at one end to the movable flap 14 and at a second end to the sensing device 18.

Figure 3:
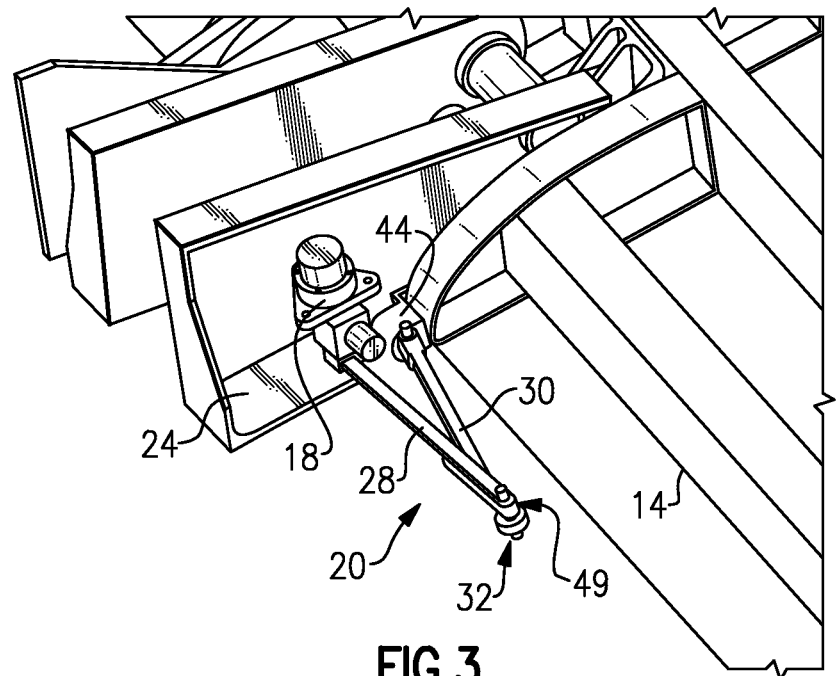
FIG. 3 is a partial cut away view of the example sensor assembly attached to the movable flap in the retracted position.
Figure 4:
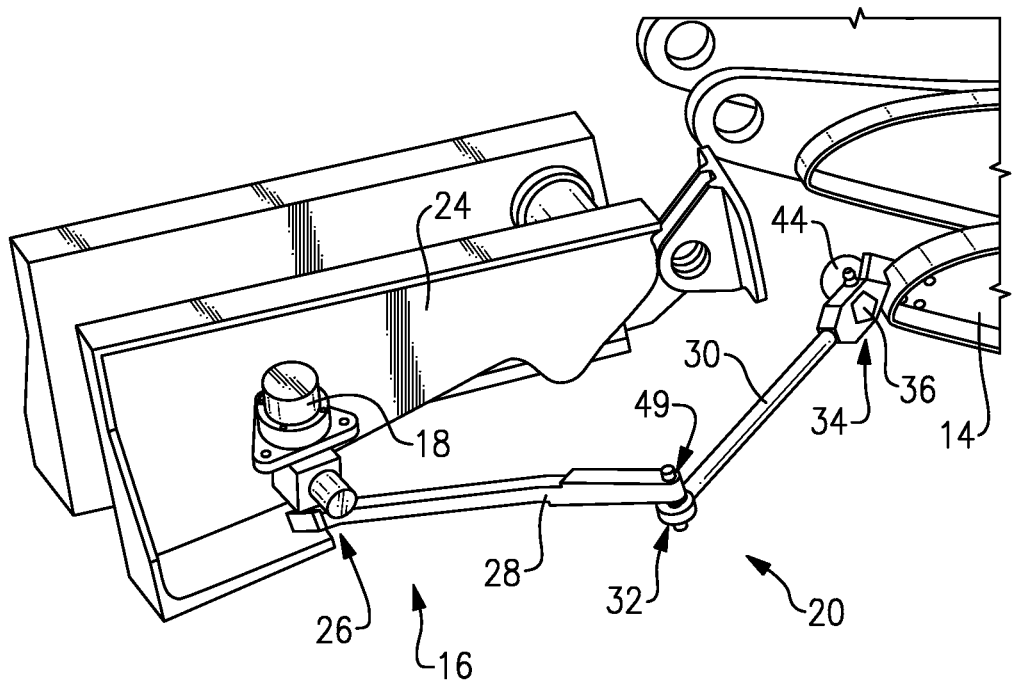
FIG. 4 is a partial section view of the example sensor assembly with the flap in a near extended position.

Referring to FIGS. 3 and 4 with continued reference to FIG. 2, the example sensor assembly 16 includes the sensing device 18 that is driven by the linkage assembly 20. The sensing device 18 includes a shaft 26 that extends downwardly and vertically relative to movement of the flap 14. Rotation of the sensor shaft 26 is detected by the sensing device 18 and utilized to indicate a position of the flap 14. In this example, the sensing device 18 comprises a resolver type skew sensor that utilizes a change in inductance that corresponds to rotation of the shaft 26 to determine a position of the flap 14. The sensing device 18 could also be a plug-in to a bearing box that would include bearings to support the linkage 20. It should be understood that other sensing devices as are known that generate a signal indicative of movement are also within the contemplation of this invention.

The linkage assembly 20 includes a first pivot arm 28 that is attached at one end to the sensor shaft 26 and at a second end to a second pivot arm 30. A central pivot 32 is provided to attach the first arm 28 to the second arm 30 such that the first and second arms 28, move about the central pivot 32 relative to each other. The first and second arms 28, 30 are movable about the central pivot 32 in approximately parallel planes. The second arm 30 contains a spherical bearing 49 at the connection to the central pivot 32, such that some motion of the second arm 30 relative to the plane of motion for the first arm 28 is possible. In this example, the first and second arms 28, 30 move within nearly parallel planes orientated horizontally. However, the specific orientation of the first and second arms 28, 30 could be modified to accommodate application specific requirements. The second arm 30 extends to a second pivot shaft 34 mounted within a first pivot shaft 36. The first pivot shaft 36 is in turn attached to the flap 14.

Movement of the example flap 14 begins in a linear direction away from the retracted position shown in FIG. 3. As the flap 14 approaches the extended position (shown in FIG. 4) it begins to rotate downwardly. The downward rotation of the flap 14 cannot be accommodated by the parallel movements of the first and second arms 28, 30. The first and second pivot shafts 36, 34 accommodate rotational movement of the flap 14 while also accommodating the linear movement of the flap 14.

Figure 5:
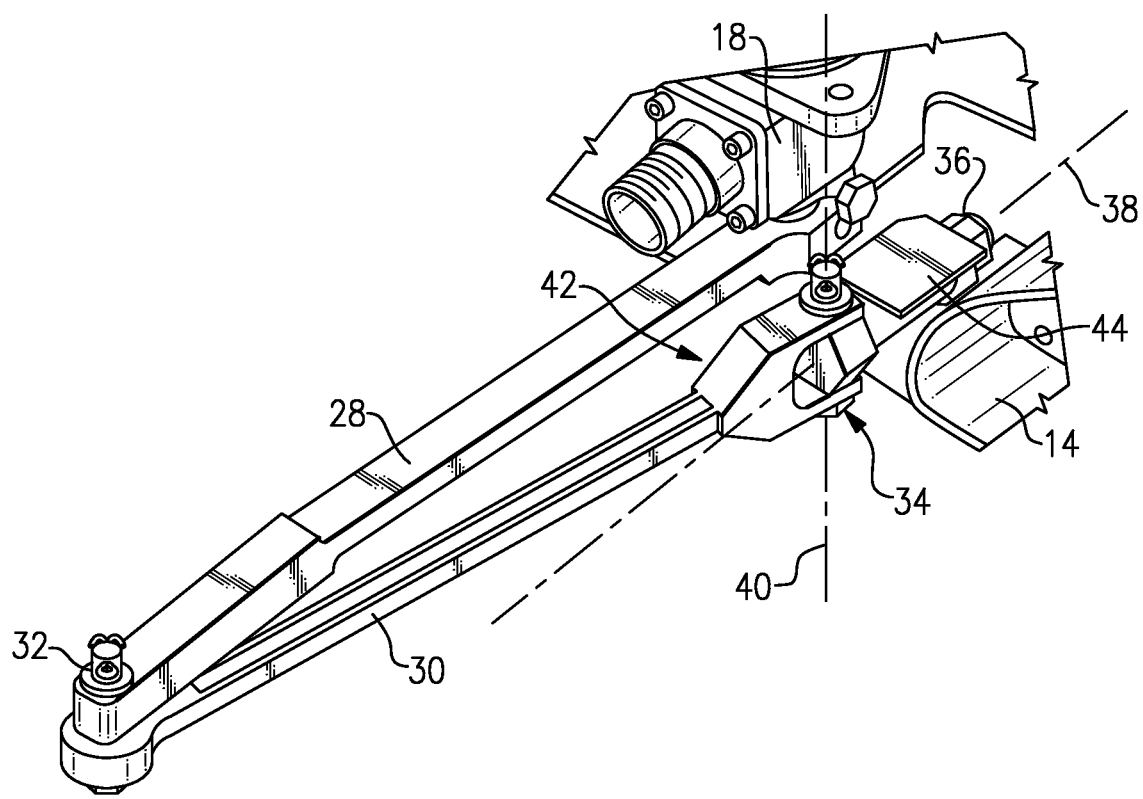
FIG. 5 is a perspective view of the example sensor assembly in the retracted position.

Referring to FIG. 5, the second arm 30 includes a gimbal attachment end that is attached to the second shaft 34. The example gimbal attachment end provides for movement at the joint about two axes. In this example, the gimbal attachment end includes a forked end 42. The connection between the forked end 42 and the second shaft 34 provides for relative movement of the second arm 30 about a second axis 40. In this example, the second axis 40 is orientated transverse to a first axis 38 about which the first shaft 36 rotates. The pivoting movement between the forked end 42 is provided by rotation of the shaft about the axis 40. Moreover, the connection between the forked end 42 provides for relative movement between the shaft 34 and the forked end 42. The example forked end 42 is not fixed to the shaft 34. In other words, the forked end 42 and the second shaft 34 are each movable relative to the first shaft 36 about the second axis 40. The first shaft 36 is attached to the flap 14 by way of mount 44. The first shaft 36 rotates about the axis 38 that accommodates rotational movement of the flap 14 relative to the plane of movement of the first and second arms. 28, 30.

Figure 6:
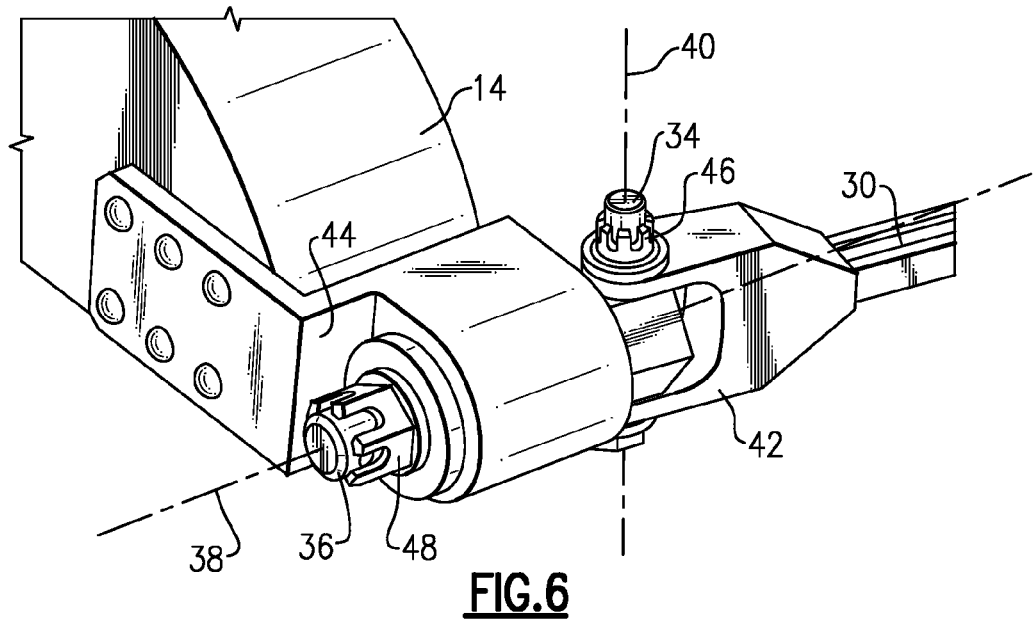
FIG. 6 is an enlarged view of a first and second pivot shafts attached to the movable flap.
Figure 7:
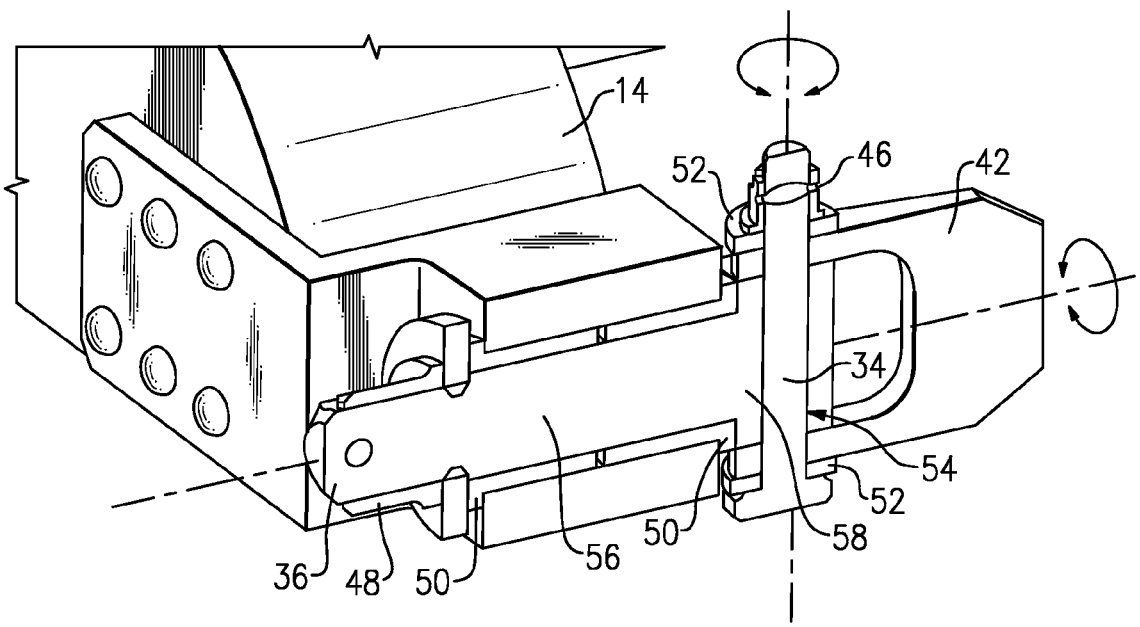
FIG. 7 is a sectional view of the example first and second pivot shafts attached to the movable flap.

Referring to FIGS. 6 and 7, the forked end 42 of the second arm 30 is shown attached to the second shaft 34. The first shaft 36 is supported within the mount 44 and the mount is secured to the flap 14. The example first shaft 36 includes a threaded end that receives a nut 48 to hold the first shaft 36 within the mount 44. The flap 14 may rotate about the axis 38 relative to the second arm 30 due to the pivoting attachment provided by the first pivot shaft 36.

The example first pivot shaft 36 includes a first portion 56 that extends along the first axis 38 and a second portion 58 that extends along the second axis 40 transverse to the first portion 56 and first axis 38. In this example the first portion 56 and the second portion 58 comprise integral features of the first pivot shaft 36. The second shaft 34 is mounted within a cavity 54 defined within the second portion 58. The second pivot shaft 34 is supported within the first shaft 36 to provide rotation about the second axis 38. A nut 46 received on the second shaft 34 holds the second shaft 34 in place. A bearing 50 is disposed between the shaft 36 and mount 44 to reduce friction and improve durability. A washer 52 is further provided between the shaft 34 and the forked end 42 that provides reduced friction and improved wear properties.

In operation, the flap 14 begins in a retracted position as is shown in FIG. 3. In the retracted position, the first and second pivot arms 28, 30 are folded over each other. Movement of the flap 14 begins linearly within the wing 12. The first and second arms 28, 30 rotate relative to each other about the center pivot 32 to unfold. The unfolding movement of the arms 28, 30 rotates the sensor shaft 26 that triggers the sensing device 18 to begin detecting movement. The movement of the sensor shaft 26 triggers the generation of a signal sent to the controller 22. Further linear movement causes further extension and unfolding of the first and second pivot arms 28, 30. Rotation of the first and second arms 28, 30 is further accommodated by the second pivot shaft 34.

As the flap approaches the fully extended position, it begins to rotate downwardly. The first and second pivot arms 28, 30 while movable within nearly parallel planes through the first portion of the flap motion can accommodate the pivoting along with the up and down movement of the flap at the fully extended position of the flap. This movement is accommodated by the first pivot shaft 36 supported within the mount 44, the second pivot shaft 34, and the spherical bearing 49 in link 30 located at the center pivot point 32. Accordingly, the example sensor assembly 16 provides for the determination of a position of the flap 14 through an extended linear movement coupled to a rotational movement. Additionally, the example sensor assembly could be utilized for any application requiring the measurement of any flight control surface or movable panel that includes movement in more than one plane such as for example, ailerons, landing gear doors and even thrust reversers utilized for a gas turbine engine.

Although an example embodiment has been disclosed, a worker of ordinary skill in this art would recognize that certain modifications would come within the scope of this disclosure. For that reason, the following claims should be studied to determine the scope and content of this invention.

What is claimed is:

1. A sensor assembly for measuring a position of a movable airfoil member, the sensor assembly comprising:
   a first pivot shaft attached for movement about a first axis, the first pivot shaft mountable to a movable airfoil member;
   a second pivot shaft attached to the first pivot shaft for movement about a second axis transverse to the first axis;
   at least one pivot arm attached to the second pivot shaft; and
   a sensor device including a sensor shaft rotatable responsive to movement of the at least one pivot arm to provide an output signal indicative of a position of the movable airfoil member.

2. The sensor assembly as recited in claim 1, wherein the at least one pivot arm comprises a first pivot arm attached to a second pivot arm, the first pivot arm pivotally attached to the sensor shaft and the second pivot arm attached to the second pivot shaft.

3. The sensor assembly as recited in claim 2, wherein the first and second pivot arms are pivotally attached to one another to provide relative movement in parallel planes.

4. The sensor assembly as recited in claim 2, wherein the first and second pivot arms are pivotally attached by a spherical bearing that provides for relative movement of the first and second pivot arms outside of parallel planes.

5. The sensor assembly as recited in claim 3, wherein movement of the first pivot shaft about the first axis is transverse to movement of the first and second pivot arms.

6. The sensor assembly as recited in claim 1, wherein the first pivot shaft provides for rotation of the moveable airfoil member about the first axis.

7. The sensor assembly as recited in claim 1, wherein the sensor shaft rotates about an axis transverse to the first axis.

8. The sensor assembly as recited in claim 1, wherein the first shaft comprises a first portion extending along the first axis and a second portion extending along the second axis, the second portion including an inner cavity supporting rotation of the second shaft.

9. The sensor assembly as recited in claim 8, wherein the second shaft is movable mounted within the second portion of the first shaft such that the second shaft rotates about the first axis with the first shaft.

10. The sensor assembly as recited in claim 1, wherein the sensor shafts extends vertically downward from the sensor device.

11. A wing flap assembly for an aircraft comprising:
    a flap movable relative to a wing; and
    a sensor assembly for determining a position of the flap relative to the wing, the sensor assembly including:
    a first pivot shaft attached for movement about a first axis, the first pivot shaft mountable to the flap;
    a second pivot shaft attached to the first pivot shaft for movement about a second axis transverse to the first axis;
    at least one pivot arm attached to the second pivot shaft; and a sensor device including a sensor shaft rotatable responsive to movement of the at least one pivot arm to provide an output signal indicative of a position of the flap.

12. The wing flap assembly as recited in claim 11, wherein the at least one pivot arm comprises a first pivot arm attached to a second pivot arm, the first pivot arm pivotally attached to the sensor shaft and the second pivot arm attached to the second pivot shaft.

13. The wing flap assembly as recited in claim 12, wherein the first and second pivot arms are pivotally attached to one another to provide relative movement in parallel planes.

14. The wing flap assembly as recited in claim 11, wherein the flap is rotatable about the first axis and the first pivot shaft.

15. The wing flap assembly as recited in claim 11, wherein the sensor shaft rotates about an axis transverse to the first axis and extends vertically downward from the sensor device.

16. A method of determining a position of a wing flap assembly comprising the steps of:
 defining movement of a wing flap between a retracted position and an extended position, wherein the wing flap is rotated relative to linear movement at the extended position;
 mounting a first pivot shaft to the wing flap about a first axis such that the wing flap is rotatable about the first axis;
 mounting a second pivot shaft to the first pivot shaft for rotation about a second axis transverse to the first axis;
 linking at least one pivot arm to the second pivot shaft for communicating movement of the wing flap to a sensor device; and
 generating an output indicative of position of the wing flap responsive to movement communicated to the sensor device through the at least one pivot arm.

17. The method as recited in claim 16, wherein linking at least one pivot arm to the second pivot shaft includes linking a first pivot arm to the sensor device and a second pivot arm to the first pivot arm and to the second pivot shaft.

18. The method as recited in claim 17, including linking the first pivot arm to the second pivot arm for movement in parallel planes.

19. The method as recited in claim 17, including mounting the sensor device such that a sensor shaft extends vertically downward relative to movement of the first pivot arm and the second pivot arm.

* * * * *